(12) United States Patent
Roppongi et al.

(10) Patent No.: US 11,085,227 B2
(45) Date of Patent: Aug. 10, 2021

(54) VEHICLE OPENING AND CLOSING APPARATUS

(71) Applicant: Mitsuba Corporation, Gunma (JP)

(72) Inventors: Hitoshi Roppongi, Kiryu (JP);
Takayuki Ikeda, Kiryu (JP); Masahiro Fueki, Kiryu (JP); Yasunori Noro, Kiryu (JP)

(73) Assignee: Mitsuba Corporation, Gunma (JP)

( * ) Notice: Subject to any disclaimer, the term of this patent is extended or adjusted under 35 U.S.C. 154(b) by 380 days.

(21) Appl. No.: 15/580,786

(22) PCT Filed: May 26, 2016

(86) PCT No.: PCT/JP2016/065585
§ 371 (c)(1),
(2) Date: Dec. 8, 2017

(87) PCT Pub. No.: WO2016/199586
PCT Pub. Date: Dec. 15, 2016

(65) Prior Publication Data
US 2018/0298671 A1    Oct. 18, 2018

(30) Foreign Application Priority Data
Jun. 12, 2015    (JP) .............................. JP2015-119565

(51) Int. Cl.
*H02P 3/12*    (2006.01)
*H02P 6/30*    (2016.01)
(Continued)

(52) U.S. Cl.
CPC .......... *E05F 15/79* (2015.01); *E05D 15/0608* (2013.01); *E05F 15/643* (2015.01);
(Continued)

(58) Field of Classification Search
CPC ............ H02K 11/215; H02K 7/14; H02P 7/03
See application file for complete search history.

(56) References Cited

U.S. PATENT DOCUMENTS 6,226,925 B1 *   5/2001   Shimura ................... G05D 3/00
                                                         49/139
6,446,745 B1 *   9/2002   Lee ........................... B60L 1/14
                                                         180/206.2
(Continued)

FOREIGN PATENT DOCUMENTS

CN    101117873 A    2/2008
CN    102678008 A    9/2012
(Continued)

OTHER PUBLICATIONS

Japanese Patent Office, Notice of Allowance issued in JP 2015-119565 dated Jul. 31, 2018, 6 pages.
(Continued)

*Primary Examiner* — Kawing Chan
*Assistant Examiner* — Charles S Laughlin
(74) *Attorney, Agent, or Firm* — Wood Herron & Evans LLP

(57) ABSTRACT

A vehicle opening and closing apparatus that opens and closes an opening and closing body provided on a vehicle includes: an electric motor that drives the opening and closing body; a position detection part that detects a position of the opening and closing body; a measurement part that measures a current value which flows in the electric motor when the opening and closing body arrives at a predetermined position; a counter that counts up a count value based on the current value; and a determination part that stops, for a predetermined period of time, the next and subsequent opening and closing operation of the opening and closing body when the count value exceeds a first threshold value.

10 Claims, 5 Drawing Sheets

(51) Int. Cl.
*B60J 5/06* (2006.01)
*E05F 15/79* (2015.01)
*E05F 15/643* (2015.01)
*E05F 15/655* (2015.01)
*E05F 15/689* (2015.01)
*E05F 15/646* (2015.01)
*E05F 15/659* (2015.01)
*E05D 15/06* (2006.01)
*H02P 29/024* (2016.01)
*E05D 15/10* (2006.01)
*E05F 15/76* (2015.01)

(52) U.S. Cl.
CPC .......... *E05F 15/646* (2015.01); *E05F 15/655* (2015.01); *E05F 15/659* (2015.01); *E05F 15/689* (2015.01); *H02P 29/027* (2013.01); *E05D 15/101* (2013.01); *E05D 15/1047* (2013.01); *E05F 15/76* (2015.01); *E05Y 2900/531* (2013.01)

(56) References Cited

U.S. PATENT DOCUMENTS

| | | | | |
|---|---|---|---|---|
| 2007/0103820 | A1* | 5/2007 | Kobayashi | H02P 29/64 361/25 |
| 2008/0178422 | A1* | 7/2008 | Imai | B60J 5/06 16/57 |
| 2014/0265978 | A1* | 9/2014 | Oakley | H02P 29/0241 318/473 |
| 2014/0285210 | A1* | 9/2014 | Kanzaki | B60L 3/04 324/503 |
| 2014/0347774 | A1* | 11/2014 | Uehara | H02H 3/0935 361/87 |

FOREIGN PATENT DOCUMENTS

| | | |
|---|---|---|
| CN | 102828667 A | 12/2012 |
| CN | 202850734 U | 4/2013 |
| CN | 103124827 B | 6/2015 |
| JP | 05096371 U | 12/1993 |
| JP | 07099754 A | 4/1995 |
| JP | 2003199393 A | 7/2003 |
| JP | 2006241866 A | 9/2006 |
| JP | 2007023586 A | 2/2007 |
| JP | 2012107433 A | 6/2012 |

OTHER PUBLICATIONS

Chinese Patent Office, Office Action issued in Chinese Patent Application No. 201680032906.9 dated Nov. 7, 2018, 8 pages.

PCT Office, International Search Report issued in PCT/JP2016/065585 dated Aug. 2, 2016, 2 pages.

* cited by examiner

VEHICLE FRONT DIRECTION ⟷ VEHICLE REAR DIRECTION

VEHICLE OPENING AND CLOSING APPARATUS

TECHNICAL FIELD

The present invention relates to a vehicle opening and closing apparatus.

Priority is claimed on Japanese Patent Application No. 2015-119565 filed on Jun. 12, 2015, the contents of which are incorporated herein by reference.

BACKGROUND

In the related art, a method is known in which, in order to prevent a coil from overheating and burning out by an excess current flowing into the coil of a motor, a thermistor is connected in an electric power distribution path of the motor (for example, Patent Document 1).

Specifically, when an excess current flows in the electric power distribution path of the motor, the temperature of the thermistor is increased, and a resistance value of the thermistor is increased in association with the temperature increase. When the resistance value of the thermistor is increased, a current supplied to the motor via the thermistor is reduced, and therefore, it is possible to prevent the motor from burning out.

RELATED ART DOCUMENTS

Patent Documents

[Patent Document 1] Japanese Unexamined Patent Application, First Publication No. H7-99754

SUMMARY OF INVENTION

Problems to be Solved by the Invention

However, when a thermistor is connected in an electric power distribution path of a motor that drives an opening and closing body (for example, a slide door) of an automobile or the like, there is a possibility that the temperature of a thermistor is increased when a foreign substance is trapped or when the opening and closing body is driven at a high frequency, and the electric power distribution to the motor is cut off. Accordingly, for example, in a case where, when it is detected that a foreign substance is trapped, the motor is reversely operated to release the foreign substance trapped by the opening and closing body, there may be a case in which, at the time of the reverse operation of the motor, the electric power distribution to the motor is cut off by the thermistor, and it is impossible to release the trapped foreign substance.

The present invention provides a vehicle opening and closing apparatus that prevents a motor from burning out by an excess current flowing without using a thermistor.

Means for Solving the Problem

An aspect of the present invention is a vehicle opening and closing apparatus that opens and closes an opening and closing body provided on a vehicle, the apparatus including: an electric motor that drives the opening and closing body; a position detection part that detects a position of the opening and closing body; a measurement part that measures a current value which flows in the electric motor when the opening and closing body arrives at a predetermined position; a counter that counts up a count value based on the current value; and a determination part that stops, for a predetermined period of time, the next and subsequent opening and closing operation of the opening and closing body when the count value exceeds a first threshold value.

Further, an aspect of the present invention is the vehicle opening and closing apparatus described above, wherein the opening and closing body is operated to be opened and closed along a guide rail that is fixed to the vehicle, the guide rail includes a straight part and a curved part, and the predetermined position is provided on the straight part.

Further, an aspect of the present invention is the vehicle opening and closing apparatus described above, wherein, when the current value that flows in the electric motor exceeds a predetermined value, the counter increases a value by which the count value is counted up compared to a case where the current value that flows in the electric motor is less than the predetermined value.

Further, an aspect of the present invention is the vehicle opening and closing apparatus described above, wherein when the opening and closing body is in a halfway stop state, the counter counts up the count value at a constant interval of time when the count value is less than a second threshold value that is smaller than the first threshold value and counts down the count value when the count value is equal to or more than the second threshold value.

Further, an aspect of the present invention is the vehicle opening and closing apparatus described above, wherein the count value is counted down at a predetermined interval of time when electric power distribution of the electric motor is stopped.

Advantage of the Invention

According to the present invention, it is possible to provide a vehicle opening and closing apparatus that prevents a motor from burning out by an excess current flowing without using a thermistor.

DESCRIPTION OF THE EMBODIMENTS

A vehicle opening and closing apparatus of the present embodiment is a vehicle opening and closing apparatus that opens and closes an opening and closing body provided on a vehicle, wherein when the opening and closing body arrives at a predetermined position, a count value is counted up based on a current value that flows in an electric motor, and the next and subsequent opening and closing operation of the opening and closing body is stopped for a predetermined period of time when the count value exceeds a threshold value. Hereinafter, the vehicle opening and closing apparatus of the present embodiment is specifically described. The present embodiment is described using an example in which the opening and closing body is a slide door; however, the present invention is not limited thereto. For example, the opening and closing body may be a power window.

Figure 1:
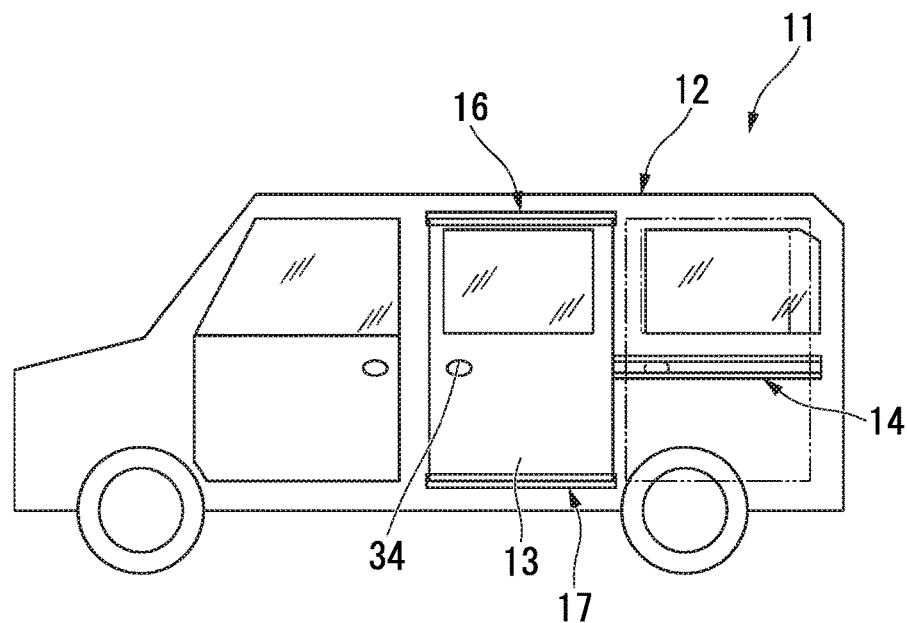
FIG. 1 is a side view showing a minivan-type vehicle that includes a vehicle opening and closing apparatus 21 of the present embodiment.
Figure 2:
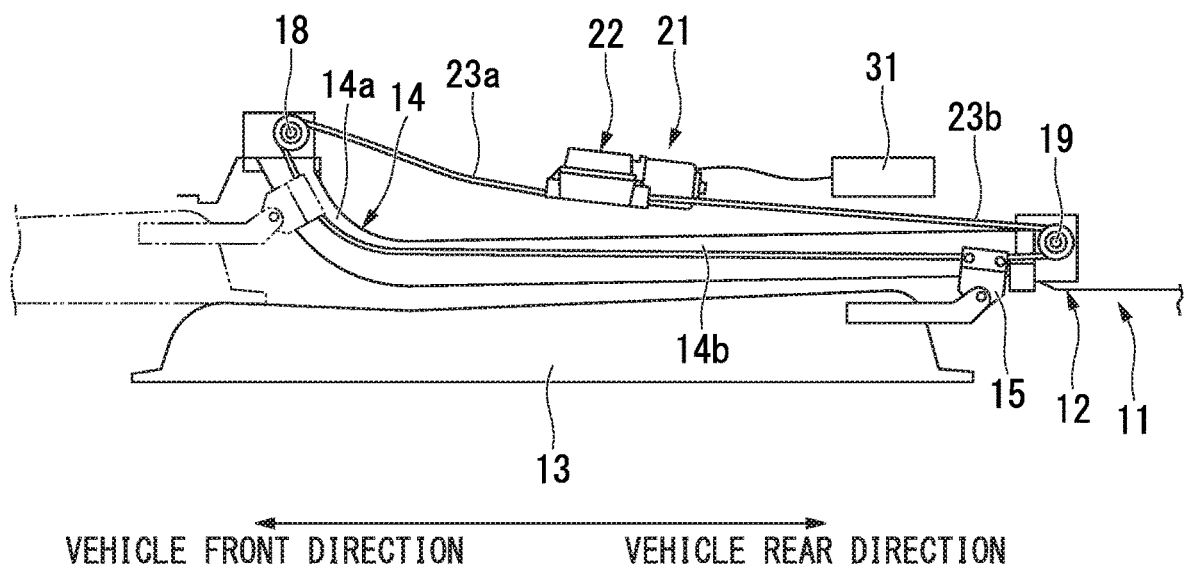
FIG. 2 is a top view of a slide door 13 and is an enlarged view showing the detail of an attachment part of the slide door 13 in the present embodiment.

Hereinafter, a vehicle opening and closing apparatus 21 in the present embodiment is described with reference to the drawings. FIG. 1 is a side view showing a minivan-type vehicle that includes the vehicle opening and closing apparatus 21 of the present embodiment. FIG. 2 is a top view of a slide door 13 in the present embodiment. In addition, FIG. 2 is an enlarged view showing the detail of an attachment part of the slide door 13.

As shown in FIG. 1 and FIG. 2, a vehicle 11 includes the slide door 13, guide rails 14, 16, 17, and the vehicle opening and closing apparatus 21.

As shown in FIG. 1, the vehicle 11 is a minivan-type passenger vehicle. The slide door 13, which is the opening and closing body, is provided on a side part of a vehicle body 12 of the vehicle 11. The slide door 13 is guided by the guide rail (guide member) 14 that is fixed to a side part of the vehicle body 12 and is openable and closeable between a full closed position indicated by a solid line in FIG. 1 and a full open position indicated by a chain line. Accordingly, when an occupant rides or exits, baggage is loaded or unloaded, and the like, the slide door 13 is opened to a desired open degree and is used. A handle 34 as an opening and closing switch is provided on the slide door 13 in order to command an opening and closing operation of the slide door 13.

As shown in FIG. 2, a roller assembly 15 is provided on the slide door 13. The roller assembly 15 is guided by the guide rail 14, and thereby, the slide door 13 is moved in a front-to-rear direction of the vehicle 11.

The guide rail 14 includes a curved part 14a, a straight part 14b, an inversion pulley 18, and an inversion pulley 19.

The curved part 14a is formed on a vehicle front side of the guide rail 14. The curved part 14a has a curved shape toward the inside of a vehicle room. The roller assembly 15 is guided by the curved part 14a, and thereby, the slide door 13 is closed in a state of being drawn to the inside of the vehicle body 12 so as to fall in the same plane as the side surface of the vehicle body 12. The straight part 14b is formed at a more vehicle rear position than the curved part 14a. The straight part 14b has a shape that is parallel with respect to the side part of the vehicle body 12.

A roller assembly 15 is provided also on upper and lower parts (an upper part and a lower part) of a front end part of the slide door 13 other than a region shown in FIG. 2. The guide rail 16 and the guide rail 17 are provided on upper and lower regions of an opening part of the vehicle body 12 corresponding to the roller assemblies 15 provided on the upper and lower parts (the upper part and the lower part) of the front end part of the slide door 13. Accordingly, the slide door 13 is supported at a total of three positions by the vehicle body 12.

Each of the inversion pulleys 18, 19 is provided on each end of the guide rail 14.

The vehicle opening and closing apparatus 21 is an apparatus that automatically opens and closes the slide door 13.

The vehicle opening and closing apparatus 21 includes a drive unit 22 and a cable 23 (cable 23a, cable 23b).

The drive unit 22 is arranged adjacent to a substantially middle part of a vehicle front-to-rear direction of the guide rail 14 and at an inner part of the vehicle body 12.

Each of the cables 23a, 23b is connected to the roller assembly 15 from each of the vehicle rear side and front side. In the drive unit 22, by drawing one of the cable 23a and the cable 23b, the slide door 13 is operated to be opened or is operated to be closed.

Figure 3:
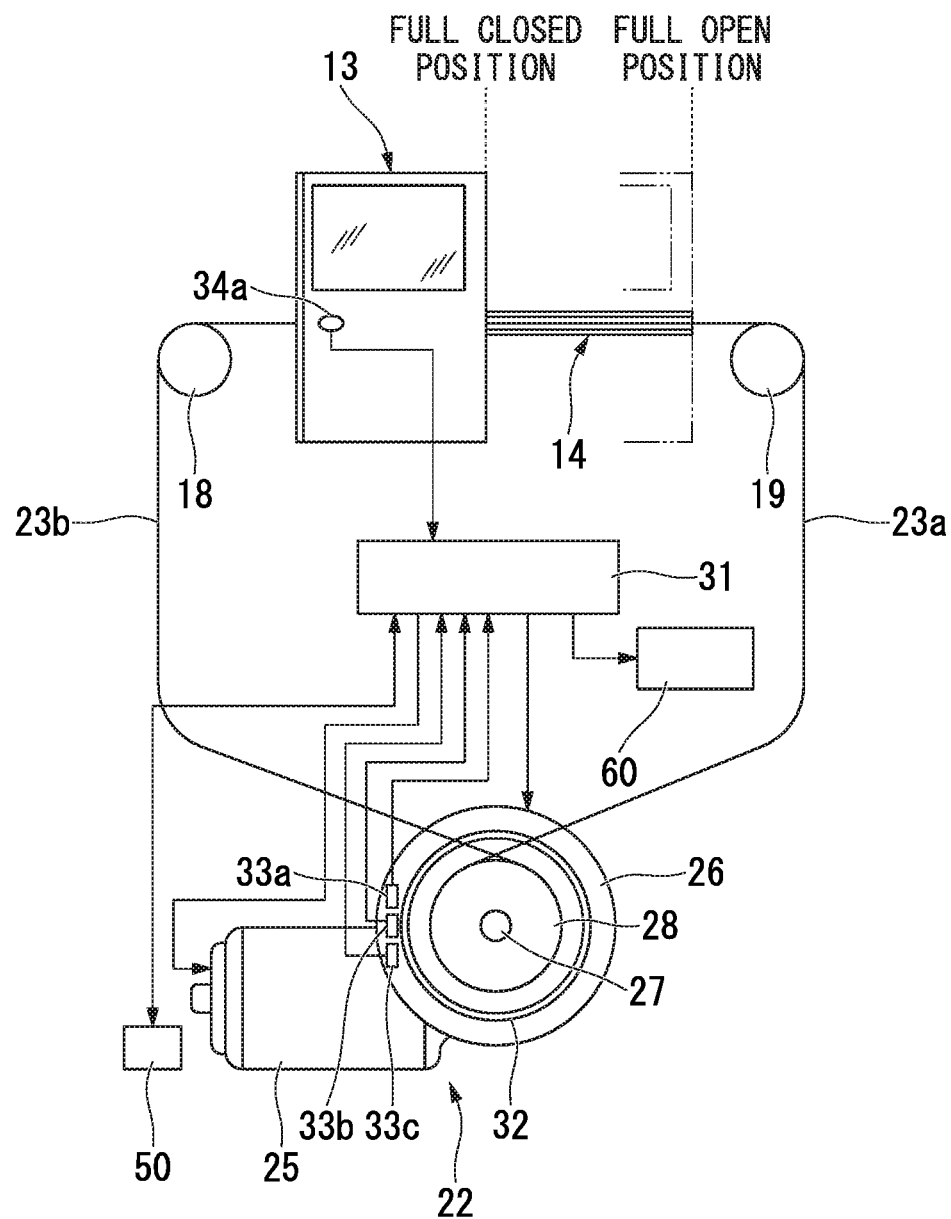
FIG. 3 is a view showing an example of a schematic configuration in a control system of the vehicle opening and closing apparatus 21 in the present embodiment.

FIG. 3 is a view showing an example of a schematic configuration in a control system of the vehicle opening and closing apparatus 21 in the present embodiment.

The vehicle opening and closing apparatus 21 includes an electric motor 25, a decelerator 26, a drum 28, a position detection part 33, a measurement part 50, and a control device 31.

The electric motor 25 is a drive source that drives the slide door 13 to be opened and closed. For example, the electric motor 25 is a motor that is rotatable in both of forward and reverse directions such as a three-phase brushless motor. The electric motor 25 is driven to be rotated based on a drive signal that is supplied from the control device 31.

The decelerator 26 is fixed to the electric motor 25. The decelerator 26 decelerates the rotation of the electric motor 25 to a predetermined rotation number using the decelerator 26. Accordingly, the rotation of the electric motor 25 is decelerated to the predetermined rotation number using the decelerator 26 and is output from an output shaft 27.

The drum 28 having a cylindrical shape and having an outer circumferential surface on which a spiral guide groove (not shown) is formed is fixed to the output shaft 27. The cable 23 is wound around the drum 28 along the guide groove a plurality of times. Accordingly, when the electric motor 25 is operated, and the drum 28 is driven by the electric motor 25 to be rotated, the slide door 13 is operated to be opened and closed. For example, when the electric motor 25 is rotated forward, the drum 28 is rotated in a counterclockwise direction. Thereby, the vehicle rear side of the cable 23 is rolled up by the drum 28, and therefore, the slide door 13 is moved in the opening direction while being drawn by the cable 23. On the other hand, when the electric motor 25 is rotated reversely, the drum 28 is rotated in a clockwise direction. Thereby, the vehicle front side of the cable 23 is rolled up by the drum 28, and therefore, the slide door 13 is moved in the closing direction while being drawn by the cable 23. As described above, the slide door 13 is connected to the electric motor 25 via the cable 23, the drum 28, the output shaft 27, and the like. The slide door 13 is driven to be opened and closed by the electric motor 25. A clutch mechanism that connects and disconnects a power transmission path between the electric motor 25 and the output shaft 27 may be provided on the decelerator 26. When the slide door 13 is manually operated to be opened and closed, the clutch mechanism may be switched to a cutoff state. A tensioner may be provided between the drum 28 and the slide door 13. The tensioner removes the slack of the cable 23 and maintains a cable tension in a predetermined range.

The position detection part 33 detects the position of the slide door 13. For example, the position detection part 33 is a magnetic rotary encoder that includes a Hall IC. For example, a sensor magnet 32 that is magnetized by multiple magnetic poles in a circumferential direction is fixed to the output shaft 27. A Hall IC 32a, a Hall IC 32b, and a Hall IC 32c, which are the position detection parts 33, are arranged close to a position that faces the sensor magnet. The Hall IC 32a, the Hall IC 32b, and the Hall IC 32c are arranged to have a predetermined phase difference from one another.

Accordingly, the position detection part 33 detects, as an electric signal, the change of a magnetic flux density that is detected by the sensor magnet 32 passing in front of the Hall IC 32a, the Hall IC 32b, and the Hall IC 32c when the drum 28 is rotated and generates three-phase (U-phase, V-phase, and W-phase) alternate signals that have a mutually different phase. Then, the position detection part 33 converts the alternate signal into a binary digital signal (pulse signal) in which an output value changes between "High" and "Low" depending on whether or not the alternate signal value of each phase exceeds a predetermined value. Whether or not the alternate signal value of each phase exceeds a predetermined value means whether or not the intensity of a magnetic field received by the position detection part 33 exceeds a predetermined intensity. The position detection part 33 outputs, as a pulse signal of each phase, a U-phase pulse signal, a V-phase pulse signal, and a W-phase pulse signal to the control device 31.

The handle 34 having a function as an opening and closing switch is provided on the slide door 13 on each of the vehicle room inner and outer sides of the slide door. The handle 34 is connected to the control device 31. When the handle 34 is operated by an occupant and the like, the handle 34 outputs to the control device 31 an opening and closing command signal that corresponds to the operation. That is, when the handle 34 is operated to an opening side by an operator such as the occupant, the handle 34 outputs to the control device 31 a command signal that commands to open the slide door 13. When the handle 34 is operated to a closing side by the operator, such as the occupant, the handle 34 outputs to the control device 31 a command signal that commands to close the slide door 13. When the control device 31 acquires the opening and closing command signal that is supplied from the handle 34, the control device 31 controls the electric motor 25 to be rotated forward or to be rotated reversely based on the opening and closing command signal. Thereby, the control device 31 can operate the slide door 13 in the opening direction or the closing direction. That is, the operator can operate the slide door 13 to be opened and to be closed automatically by operating the handle 34.

The measurement part 50 is connected to the control device 31. The measurement part 50 measures a value of a current that flows in the electric motor 25. Hereinafter, a value of a current that flows in the electric motor 25 is referred to as a motor current value. The measurement part 50 outputs the measured motor current value to the control device 31. For example, when the handle 34 is operated by the operator such as the occupant, and the electric motor 25 is driven, the measurement part 50 measures the motor current value at a constant period and outputs the measured motor current value to the control device 31.

An alert part 60 includes a speech generation unit such as a speaker or a buzzer. The alert part 60 notifies the operator of the opening and closing operation of the slide door 13 according to the command signal being prohibited. The reason for the opening and closing operation of the slide door 13 according to the command signal being prohibited is to prevent the electric motor 25 from overheating and burning out by an excess current flowing into the electric motor 25. A sound that is output when the alert part 60 performs notification is, for example, a speech message or a buzzer sound. The alert part 60 may generate a speech message and a buzzer sound alternately. The alert part 60 may be an illuminant such as a light-emitting diode (LED).

The control device 31 controls the opening and closing operation of the slide door 13 by controlling the rotation drive of the electric motor 25 based on the opening and closing command signal that is supplied from the handle 34. Thereby, the control device 31 prevents the burning of a coil of the electric motor 25 that occurs due to an excess current flowing into the electric motor 25. For example, the case where an excess current flows is a case where, at the time of a closing operation of the slide door 13, a foreign substance is trapped between the slide door 13 and the vehicle body 12, and thereby, the slide door 13 is stopped for a certain period of time. Alternatively, the case where an excess current flows is a case where the slide door 13 is operated to be opened and closed at a high frequency by the operator. The control device 31 estimates the temperature of the electric motor 25 and prohibits the opening and closing operation of the slide door 13 according to the command signal before the electric motor 25 becomes overheated.

Figure 4:
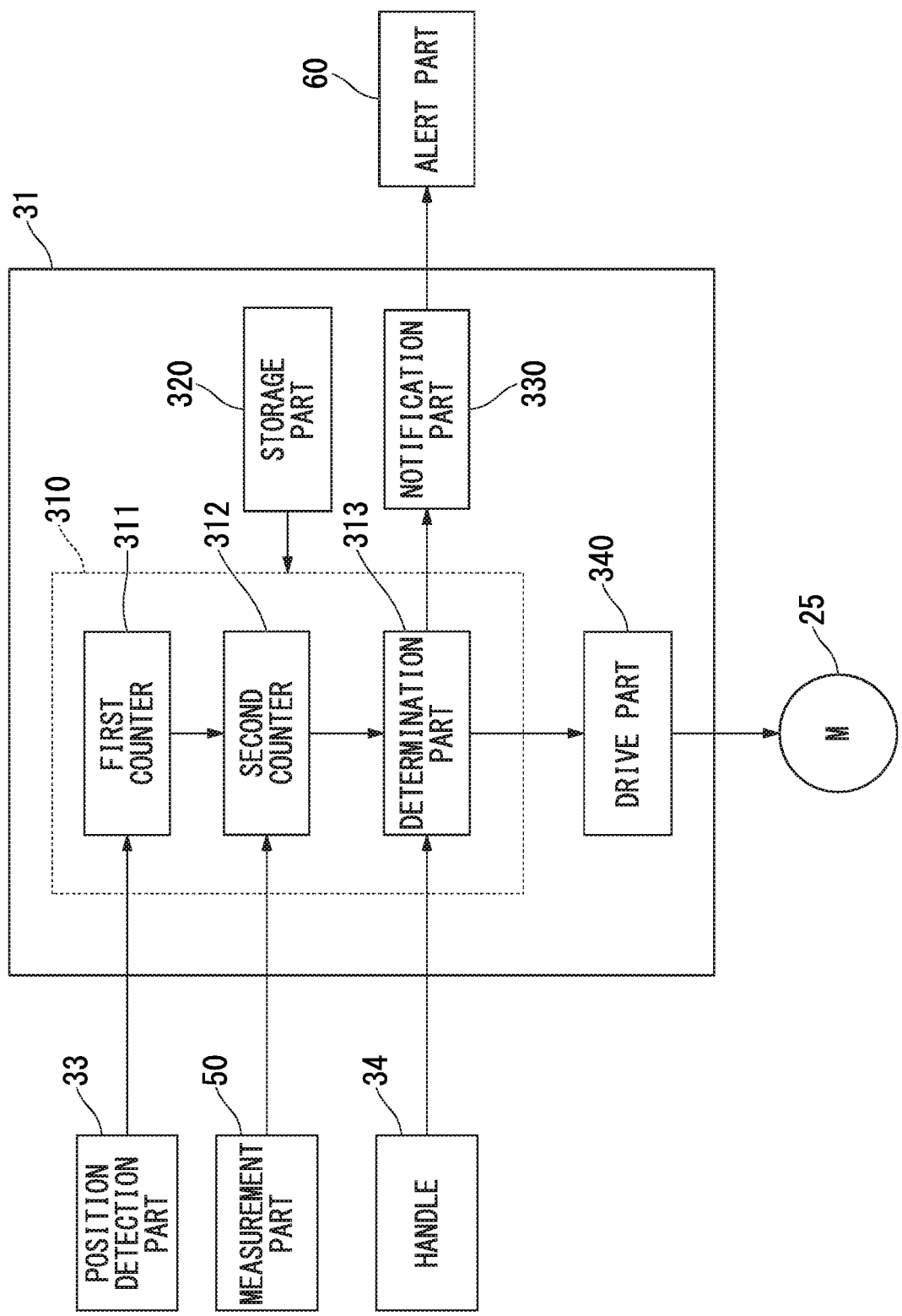
FIG. 4 is a view showing an example of a schematic configuration of a control device in the present embodiment.

FIG. 4 is a view showing an example of a schematic configuration of a control device in the present embodiment.

The control device 31 includes a control part 310, a storage part 320, a notification part 330, and a drive part 340.

The control part 310 estimates the temperature of the electric motor 25 based on the pulse signal that is supplied from the position detection part 33 and the motor current value that is supplied from the measurement part 50.

The control part 310 outputs to the drive part 340 a control signal that commands to rotate forward or rotate reversely the electric motor 25 based on the command signal that is supplied from the handle 34. The drive part 340 is formed of a plurality of switching elements (not shown). The control part 310 controls a particular switching element of the plurality of switching elements to be "ON" in response to the pattern of the U-phase, V-phase, and W-phase pulse signals that are supplied from the position detection part 33. Then, the control part 310 performs a control in which the switching element that is controlled to be "ON" is switched in response to the switching of the pulse signal. Thereby, the control part 310 controls the rotation direction and the rotation speed of the electric motor 25. When the control part 310 determines that the temperature of the electric motor 25 becomes equal to or more than a predetermined temperature, the control part 310 does not output the control signal to the drive part 340 even when the control part 310 acquires the command signal. For example, the predetermined temperature is a temperature at which the electric motor 25 becomes overheated.

The control part 310 includes a first counter 311, a second counter 312, and a determination part 313.

When the opening and closing operation of the slide door 13 according to the command signal is started, the first counter 311 counts the pulse number of the pulse signal that is supplied from the position detection part 33. Alternatively, the first counter 311 counts the pulse number of the pulse signal that is supplied from the position detection part 33 when the pulse signal appears. That is, the first counter 311 determines a time when the slide door 13 is at a predetermined position (for example, a full open position) as a base and increments a count value N1 at each time when the pulse signal is acquired. Accordingly, the control part 310 can detect the position of the slide door 13 based on the count value N1.

When the slide door 13 arrives at a measurement position, the second counter 312 counts up a count value N2 based on a current value that flows in the electric motor 25. The count value N2 is a value that corresponds to the temperature of the electric motor 25. A value by which the count up is performed is set in advance based on the current value that flows in the electric motor 25. Thereby, the control part 310 can estimate the temperature of the electric motor 25 based on the count value N2. The details are described below.

When the position of the slide door 13 arrives at a measurement position that is set in advance, the second counter 312 acquires a motor current value that is supplied from the measurement part 50. The measurement position is a position at which the motor current value becomes stable. The measurement position is provided on the straight part 14b of the guide rail 14. That is, the second counter 312 acquires the motor current value that is supplied from the measurement part 50 when the count value N1 of the first counter 311 becomes a count value Nth1 that corresponds to the measurement position. In order to acquire an accurate motor current value, it is preferable that the count value Nth1 have a certain width. That is, the second counter 312 acquires a motor current value when the count value N1 of the first counter 311 is equal to or more than the count value Nth1 and is equal to or less than a count value Nth2.

Figure 5:
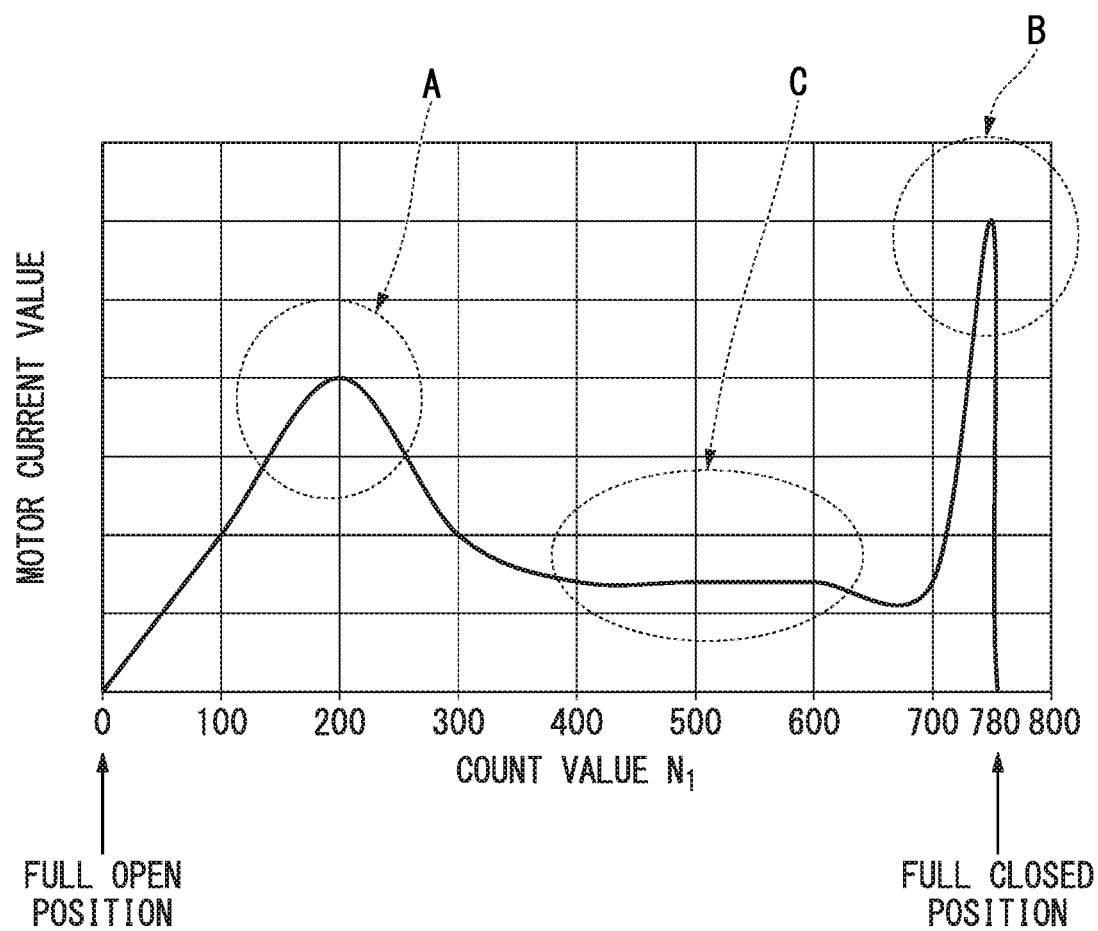
FIG. 5 is a view showing an example of a relationship between a count value N1 and a motor current value in the present embodiment.

FIG. 5 is a view showing an example of a relationship between the count value N1 and the motor current value in the present embodiment. As shown in FIG. 5, for example, when the position of the slide door 13 is at the full open position of the guide rail 14, the count value N1 is 0. When the position of the slide door 13 is at the full closed position of the guide rail 14, the count value N1 is 780.

When the slide door 13 is operated to be opened or is operated to be closed according to the command signal, the motor current value has two peaks which are a peak (count value N1=200) in a region A and a peak (count value N1=760) in a region B. The region A indicates a current value when the slide door 13 is moving at a position of the curved part 14a. A peak of the region B indicates a position close to the full closed position of the slide door 13. A region C indicates a current value when the slide door 13 is moving at a position of the straight part 14b. As shown in FIG. 5, when the position of the slide door 13 is a position from the full open position to the curved part 14a and is in the vicinity of the full closed position, the motor current value is not stabilized and is fluctuated. On the other hand, when the position of the slide door 13 is a position of the straight part 14b, the motor current value becomes stable. Accordingly, an arbitrary position of the straight part 14b is determined as a measurement position, for example, the count value Nth1 is set to 495, and the count value Nth2 is set to 505.

The second counter 312 counts up or counts down the count value N2 by a value that is set in advance based on the count value N1 and the motor current value. A condition for counting up the second counter 312 in the present embodiment is described below.

The second counter 312 counts up the count value N2 by any of a plurality of values that are set in advance in the following conditions (1) to (4). The value (hereinafter, referred to as a "count-up value") shown below by which the count value N2 is counted up is an example, and the present invention is not limited thereto.

(1) When a motor current value I1 in the measurement position is equal to or more than a threshold value Ith, the count value N2 is counted up by 3. On the other hand, when the motor current value I1 in the measurement position is less than the threshold value Ith, the count value N2 is counted up by 1.

(2) When the slide door 13 cannot arrive at the measurement position, the count value N2 is counted up by 3.

(3) When the slide door 13 is in a halfway stop state, and the count value N2 is equal to or less than a threshold value Na, the count value is counted up depending on an elapsed time of the halfway stop state.

(4) When the operation direction of the slide door 13 from the halfway stop state is different from the last operation direction, the count value N2 is counted up.

The above condition (1) is described. The second counter 312 counts up the count value N2 by 3 in a case where the motor current value I1 when the count value N1 is equal to or more than the count value Nth1 and is equal to or less than the count value Nth2 (>Nth1) is equal to or more than the threshold value Ith that is set in advance. On the other hand, the second counter 312 counts up the count value N2 by 1 in a case where the motor current value I1 when the count value N1 is equal to or more than the count value Nth1 and is equal to or less than the count value Nth2 is less than the threshold value Ith that is set in advance. For example, the threshold value Ith is a value that is determined from a relationship between an increase rate of a temperature of the electric motor 25 and the motor current value. Alternatively, the threshold value Ith is a motor current value when an increase rate of a temperature of the electric motor 25 is high.

The above condition (2) is described. The second counter 312 counts up the count value N2 by 3 in a case where the count value N1 does not reach the count value Nth1 (or the count value Nth2) within a predetermined period of time. The case where the count value N1 does not reach the count value Nth1 (or the count value Nth2) within a predetermined period of time indicates a case where, in the opening operation or the closing operation of the slide door 13, the slide door 13 cannot arrive at the measurement position due to an operation to stop the slide door 13 manually by an operator or a trapped foreign substance. At this time, the slide door 13 is stopped at a position of the guide rail 14 other than the full closed position and the full open position. Accordingly, in order to prevent the slide door 13 from freely falling at the guide rail 14, the control device 31 does not perform a switching control of the plurality of switching elements of the drive part 340 according to the switching of the pulse signal that is supplied from the position detection part 33. The control device 31 performs a control in which an "ON" control to a particular switching element is maintained and causes the electric motor 25 to generate a holding force that stops the slide door 13. The control in which an "ON" control to a particular switching element is maintained is to perform a one-phase electric power distribution to the electric motor 25. A state in which the slide door 13 is stopping by the one-phase electric power distribution of the electric motor 25 is referred to as the halfway stop state.

The above condition (3) is described. When the slide door 13 is in the halfway stop state, a current is flowing in the electric motor 25 by the one-phase electric power distribution of the electric motor 25, and therefore, the electric motor 25 generates heat. Therefore, when the slide door 13 is in the halfway stop state, and the count value N2 is equal to or less than the threshold value Na, the second counter 312 counts up the count value N2 depending on the elapsed time of the halfway state. For example, the second counter 312 acquires a count-up value corresponding to the current elapsed time of the halfway state from a one-phase electric power distribution increase map that indicates a relationship between an elapsed time of the halfway state and a count-up value. The one-phase electric power distribution increase map is set such that as the elapsed time becomes longer, the count-up value becomes larger. The count-up value of the one-phase electric power distribution increase map is determined based on a relationship between an elapsed time of the halfway state and a temperature increase value by which the temperature of the electric motor 25 is increased by the one-phase electric power distribution. For example, the threshold value Na is a count value N2 that corresponds to a saturation temperature of the electric motor 25 at the time of the one-phase electric power distribution. Hereinafter, the saturation temperature of the electric motor 25 at the time of the one-phase electric power distribution is referred to as a one-phase electric power distribution saturation temperature.

The above condition (4) is described. When the slide door 13 moves from the halfway stop state in a different direction than the last operation direction of the slide door 13, the second counter 312 counts up the count value N2. That is, in a case where the opening operation of the slide door 13, the halfway stop state, and the closing operation of the slide door 13 are in this order, or the closing operation of the slide door 13, the halfway stop state, and the opening operation of the slide door 13 are in this order, the second counter 312 counts up the count value N2 at the second closing operation or opening operation in accordance with the conditions (1), (2) described above. The second closing operation or opening operation is an operation from the halfway stop state. In the first operation of the slide door 13 and the halfway stop state, the second counter 312 counts up the count value N2 under the conditions (1) to (3) described above. In the case where the opening operation of the slide door 13, the halfway stop state, and the closing operation of the slide door 13 are in this order, or the closing operation of the slide door 13, the halfway stop state, and the opening operation of the slide door 13 are in this order, the total value of values by which the count value N2 is counted up is up to 4. For example, in the case where the opening operation of the slide door 13, the halfway stop state, and the closing operation of the slide door 13 are in this order, when the count value N2 is counted up by 3 at the opening operation of the slide door 13, the second counter 312 counts up the count value N2 by 1 regardless of a value of the motor current value I1 at the closing operation of the slide door 13. When the slide door 13 moves from the halfway stop state in the same direction as the last operation direction of the slide door 13, the count value N2 is not counted up at the second closing operation or opening operation.

A condition for counting down the second counter 312 in the present embodiment is described below.

The second counter 312 counts down the count value N2 by any of a plurality of values that are set in advance in the following conditions (5) to (7). The value shown below by which the count value N2 is counted down is an example, and the present invention is not limited thereto. Hereinafter, the value by which the count value N2 is counted down is referred to as a count-down value.

(5) When the slide door 13 is in a halfway stop state, and the count value N2 exceeds the threshold value Na, the count value is counted down depending on an elapsed time of the halfway state.

(6) When the slide door 13 is in a free stop state, the count value is counted down depending on an elapsed time of the free stop state.

(7) When the count value N2 is reset, the count value N2 is set to a predetermined count number Nb (>Na), and the count value N2 is counted down.

The above condition (5) is described. When the slide door 13 is in the halfway stop state, a current is flowing in the electric motor 25 by the one-phase electric power distribution of the electric motor 25. When the one-phase electric power distribution is performed in a case where the count value N2 exceeds the threshold value Na, the temperature of the electric motor 25 is decreased so as to be the one-phase electric power distribution saturation temperature. The case where the count value N2 exceeds the threshold value Na is a case where the temperature of the electric motor 25 is higher than the one-phase electric power distribution saturation temperature. Accordingly, when the slide door 13 is in the halfway stop state, and the count value N2 exceeds the threshold value Na, the second counter 312 counts down the count value N2 depending on the elapsed time of the halfway state. The second counter 312 does not count down the count value N2 when the count value N2 becomes the threshold value Na. For example, the second counter 312 acquires a count-down value corresponding to the current elapsed time of the halfway state from a one-phase electric power distribution decrease map that indicates a relationship between an elapsed time of the halfway state and a count-down value. The one-phase electric power distribution decrease map is set such that as the elapsed time becomes longer, the count-down value becomes larger. The count-down value of the one-phase electric power distribution decrease map is determined based on a relationship between an elapsed time of the halfway state and a heat release curve of the electric motor 25 at the time of the one-phase electric power distribution.

The above condition (6) is described. When the slide door 13 is at the full closed position or at the full open position, the electric power is not distributed to the electric motor 25 by the control device 31. Accordingly, when the electric power is not distributed to the electric motor 25, the temperature of the electric motor 25 is decreased, and therefore, the second counter 312 counts down the count value depending on an elapsed time. A state of the slide door 13 when the electric power is not distributed to the electric motor 25 is referred to as a free stop state. For example, the second counter 312 acquires a count-down value corresponding to the current elapsed time of the free stop state from a free stop state decrease map that indicates a relationship between an elapsed time of the free stop state and a count-down value. The free stop state decrease map is set such that as the elapsed time becomes longer, the count-down value becomes larger. The count-down value of the free stop state decrease map is determined based on a relationship between an elapsed time of the free stop state and a heat release curve of the electric motor 25 when the electric power distribution is not performed.

The above condition (7) is described. In a case where a supply of an electric power source to the control device 31 is stopped, there may be a case in which a value of the count value N2 is lost. For example, the case where a supply of an electric power source to the control device 31 is stopped is a case where a battery (not shown) that is provided on the vehicle 11 is detached. Accordingly, when a supply of an electric power source to the control device 31 is started, the control device 31 sets the count value N2 to the predetermined count number Nb. Then, the control device 31 counts down the count value N2. The count-down value is obtained by the above condition (5) or the above condition (6).

The determination part 313 reads out the count number N2 of the second counter 312 at each time when the opening operation or the closing operation is finished. The determination part 313 determines whether or not the count value N2 is equal to or more than a threshold value Nc (>Na). In the present embodiment, the threshold value Nc is set to the same value as the count number Nb.

When the count value N2 is equal to or more than the threshold value Nc, the determination part 313 determines that the electric motor 25 is in an overheated state and does not output a control signal to the drive part 340 even when acquiring a command signal. That is, the control part 310 prohibits the opening and closing operation of the slide door 13 according to the command signal. The determination part 313 outputs to the notification part 330 a prohibition signal which indicates that the opening and closing operation of the slide door 13 is prohibited. When the count value N2 is less than the threshold value Nc, the determination part 313 removes the prohibition of the opening and closing operation of the slide door 13 according to the command signal. Accordingly, when the determination part 313 acquires the command signal, the determination part 313 outputs a control signal to the drive part 340. When the determination part 313 removes the prohibition of the opening and closing operation of the slide door 13 according to the command signal, the determination part 313 stops outputting the prohibition signal to the notification part 330. It is desirable that the threshold value Nc be set to a count value N2 that corresponds to a lower temperature than a temperature at which the electric motor 25 actually becomes overheated.

The notification part 330 notifies the operator of the prohibition of the opening and closing operation of the slide door 13 based on the prohibition signal that is supplied from the determination part 313. For example, the notification part 330 outputs to the alert part 60 speech message information or buzzer sound information which indicates that the opening and closing operation of the slide door 13 is prohibited.

The drive part 340 outputs a drive signal to the electric motor 25 based on the control signal that is supplied from the determination part 313 to thereby drive the electric motor 25 to be rotated.

Figure 6:
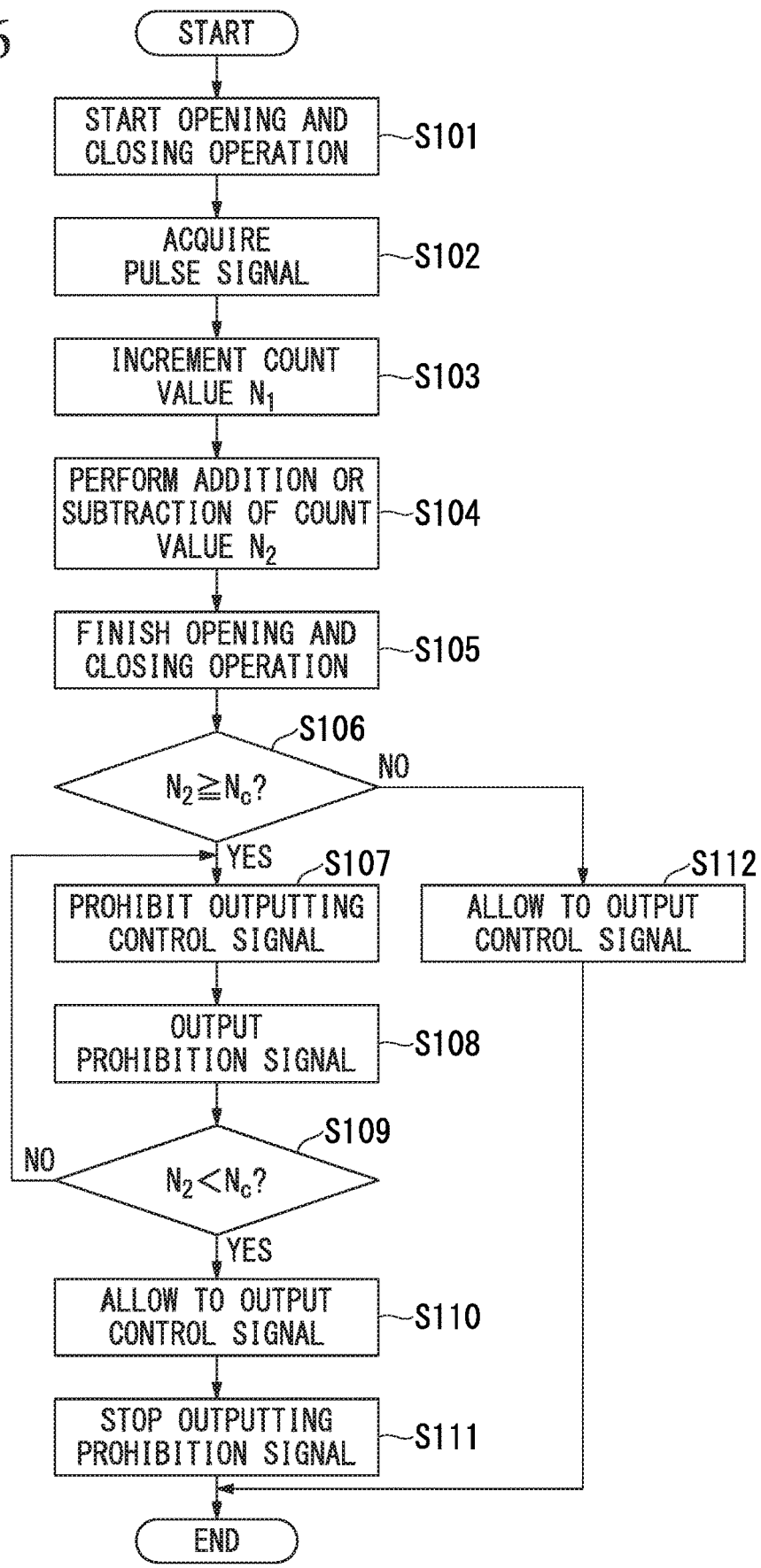
FIG. 6 is a view showing a process flow of an operation of a control device 31 in the present embodiment.

Hereinafter, an operation of the control device 31 in the present embodiment is described with reference to FIG. 6. FIG. 6 is a view showing a process flow of an operation of the control device 31 in the present embodiment. In a case described below, the count value N2 is less than the threshold value Nc as an initial state.

In Step S101, when the handle 34 is operated by an occupant and the like, the handle 34 outputs to the control device 31 an opening and closing command signal that corresponds to the operation. When the control device 31 acquires the opening and closing command signal that is supplied from the handle 34, the control device 31 controls the electric motor 25 to be rotated forward or to be rotated reversely based on the opening and closing command signal.

In Step S102, when the opening and closing operation of the slide door 13 according to the command signal is started (or when the pulse signal appears), the first counter 311 counts the pulse number of the pulse signal that is supplied from the position detection part 33.

In Step S103, the first counter 311 determines a time when the slide door 13 is at a predetermined position as a base and increments a count value N1 at each time when the pulse signal is acquired.

In Step S104, when the position of the slide door 13 arrives at a measurement position that is set in advance, the second counter 312 acquires a motor current value that is supplied from the measurement part 50. The second counter 312 counts up or counts down the count value N2 by a value that is set in advance in accordance with the conditions (1) to (7) described above.

In Step S105, when the slide door 13 arrives at the full closed position or the full open position, the control device 31 finishes the opening and closing operation according to the command signal.

In Step S106, the determination part 313 reads out the count number N2 of the second counter 312. The determination part 313 determines whether or not the count value N2 is equal to or more than a threshold value Nc. When the count value N2 is equal to or more than the threshold value Nc, the determination part 313 determines that the electric motor 25 is in an overheated state and performs a process of Step S107. When the count value N2 is less than the threshold value Nc, the determination part 313 determines that the electric motor 25 is not in the overheated state and performs a process of Step S112.

In Step S107, the determination part 313 prohibits the opening and closing operation of the slide door 13 according to the command signal. The determination part 313 outputs to the notification part 330 a signal which indicates that the opening and closing operation of the slide door 13 is prohibited.

In Step S108, the determination part 313 outputs to the notification part 330 a prohibition signal which indicates that the opening and closing operation of the slide door 13 is prohibited. When acquiring the prohibition signal, the notification part 330 outputs to the alert part 60 speech message information or buzzer sound information which indicates that the opening and closing operation of the slide door 13 is prohibited. The alert part 60 outputs a speech message or a buzzer sound based on the speech message information or the buzzer sound information.

In Step S109, the determination part 313 reads out the count number N2 of the second counter 312. The determination part 313 determines whether or not the count value N2 is equal to or more than the threshold value Nc. When the count value N2 is equal to or more than the threshold value Nc, the determination part 313 determines that the electric motor 25 is still in the overheated state and performs the process of Step S107 again. When the count value N2 is less than the threshold value Nc, the determination part 313 determines that the electric motor 25 is not in the overheated state and performs a process of Step S110.

In Step S110, when the count value N2 is less than the threshold value Nc, the determination part 313 removes the prohibition of the opening and closing operation of the slide door 13 according to the command signal. That is, when the determination part 313 acquires the command signal, the determination part 313 outputs a control signal to the drive part 340.

In Step S111, when the determination part 313 removes the prohibition of the opening and closing operation of the slide door 13 according to the command signal, the determination part 313 stops outputting the prohibition signal to the notification part 330. Thereby, the alert part 60 stops outputting the speech message or the buzzer sound.

In Step S112, when the count value N2 is less than the threshold value Nc, the determination part 313 allows the opening and closing operation of the slide door 13 according to a command signal. That is, when the determination part 313 acquires the command signal, the determination part 313 outputs a control signal to the drive part 340.

As described above, the vehicle opening and closing apparatus 21 of the present embodiment counts up the count value N2 based on the motor current value when the slide door 13 arrives at the measurement position. Then, the vehicle opening and closing apparatus 21 stops the next and subsequent opening and closing operation of the slide door 13 for a predetermined period of time when the count value N2 exceeds the threshold value Nc (first threshold value). Thereby, it is possible to prevent the motor from burning out without using a burnout protection element such as a thermistor or a sensor that measures a temperature. Further, since the vehicle opening and closing apparatus 21 counts the opening and closing operation of the slide door 13, a special calculation formula is not required, and a calculation load is low.

Further, as described above, in the vehicle opening and closing apparatus 21 of the present embodiment, the measurement position is the straight part 14b of the guide rail 14. Thereby, the vehicle opening and closing apparatus 21 can acquire a stable motor current value.

Further, as described above, the vehicle opening and closing apparatus 21 of the present embodiment increases a value by which the count value N2 is counted up compared to a case where the motor current value is less than the threshold value Ith when the motor current value exceeds the threshold value Ith. Thereby, it is possible to improve the accuracy of temperature estimation of the electric motor 25 using the count value N2.

Further, as described above, the vehicle opening and closing apparatus 21 of the present embodiment counts up the count value N2 at a constant interval of time when the slide door 13 is in a halfway stop state and when the count value N2 is less than the threshold value Na (second threshold value) that is smaller than the threshold value Nc. On the other hand, the vehicle opening and closing apparatus 21 counts down the count value N2 when the count value N2 is equal to or more than the threshold value Na. Thereby, it is possible to improve the accuracy of temperature estimation of the electric motor 25 using the count value N2.

Further, as described above, the vehicle opening and closing apparatus 21 of the present embodiment counts down the count value N2 at a predetermined interval of time when electric power distribution of the electric motor 25 is stopped. Thereby, it is possible to improve the accuracy of temperature estimation of the electric motor 25 using the count value N2.

In the embodiment described above, the vehicle opening and closing apparatus 21 prohibits the opening and closing operation of the slide door 13 according to the command signal when the count value N2 is equal to or more than the threshold value Nc. The vehicle opening and closing apparatus 21 does not prohibit the opening and closing operation of the slide door 13 according to the command signal even when the count value N2 is equal to or more than the threshold value Nc at the time of detection of trapping, at the time of operation of a door closer, or at the time of a closing operation when the vehicle 11 is traveling (there is a vehicle speed). That is, when detecting trapping, the vehicle opening and closing apparatus 21 does not prohibit a reverse operation of the slide door 13. When the door closer that forces the slide door 13 to move from a half opening state of the door to the full closed state using the power of the motor is being operated, and when the count value N2 is equal to or more than the threshold value Nc, the vehicle opening and closing apparatus 21 does not prohibit the closing operation of the slide door 13 according to the command signal and causes the slide door 13 to be reversely operated. The vehicle opening and closing apparatus 21 does not prohibit the closing operation of the slide door 13 when the vehicle 11 is traveling. Thereby, it is possible to provide a vehicle opening and closing apparatus that prevents the motor from burning out without blocking the operation of the slide door 13.

In the embodiment described above, the vehicle opening and closing apparatus 21 may switch from one-phase electric power distribution to regeneration braking and fully close the slide door 13 while weakening the deceleration force of the slide door 13 when a predetermined period of time in the halfway stop state of the slide door 13 elapses. The vehicle opening and closing apparatus 21 counts down the count value N2 by a predetermined count-down value at the time of regeneration braking.

The control part 310 in the embodiment described above may be realized by a computer. In this case, a program for realizing the function may be recorded in a computer-readable recording medium, and the program recorded in the recording medium may be read into and executed on a computer system to thereby perform the function. It is assumed that the "computer system" used herein includes an OS or hardware such as peripherals. The "computer-readable recording medium" refers to portable media such as a flexible disk, a magneto-optical disc, a ROM, and a CD-ROM and a storage device such as a hard disk embedded in the computer system. Further, the "computer-readable recording medium" may include a recording medium that holds a program dynamically for a short period of time like a network such as the Internet or a communication line when a program is transmitted through a communication line such as a telephone line and may include a recording medium that stores a program for a predetermined period of time like a volatile memory in a computer system which serves as a server or a client in this case. Further, the above program may be a program for realizing some of the functions described above, may be a program capable of realizing the above functions by combination with a program already recorded in the computer system, or may be a program that is realized by using a programmable logic device such as the FPGA (Field-Programmable Gate Array).

Although an embodiment of the invention has been described in detail with reference to the drawings, a specific configuration is not limited to the embodiment, and designs and the like without departing from the scope of the invention are also included.

INDUSTRIAL APPLICABILITY

According to the vehicle opening and closing apparatus described above, it is possible to prevent the motor from burning out without using a burnout protection element such as a thermistor or a sensor that measures a temperature.

DESCRIPTION OF THE REFERENCE SYMBOLS 11 vehicle
12 vehicle body
13 slide door
14, 16, 17 guide rail
14a curved part
14b straight part
18, 19 inversion pulley
21 vehicle opening and closing apparatus
22 drive unit
25 electric motor
33 position detection part
31 control device
50 measurement part
60 alert part
310 control part
311 first counter
312 second counter
313 determination part
320 storage part
330 notification part
340 drive part

The invention claimed is:

1. A vehicle opening and closing apparatus that opens and closes an opening and closing body provided on a vehicle, the apparatus comprising:
   an electric motor that drives the opening and closing body;
   a drive part that is connected to the electric motor and that includes a plurality of switching elements;
   a control part that outputs to the drive part a control signal that commands to rotate forward or rotate reversely the electric motor;
   a position detection part that detects a position of the opening and closing body; and
   a measurement part that measures a current value which flows in the electric motor when the position detection part detects that the opening and closing body arrives at a predetermined position, wherein
   a counter that increments or decrements a count value based on the current value, the count value being updated such that it corresponds to a temperature of the electric motor; and
   a determination part which determines that the count value exceeds a first threshold value indicative of the electric motor being in an overheated state,
   the control part prohibits the next and subsequent opening and closing operation of the opening and closing body when the determination part determines that the count value exceeds the first threshold value to thereby prevent motor burnout due to overheating, and
   when the opening and closing body is in a halfway stop state, and the count value is equal to or less than a second threshold value that is smaller than the first threshold value, the count value is incremented up depending on an elapsed time of the halfway stop state of the opening and closing body.

2. The vehicle opening and closing apparatus according to claim 1, wherein the opening and closing body is operated to be opened and closed along a guide rail that is fixed to the vehicle,
   the guide rail comprises a straight part and a curved part, and
   the predetermined position is provided on the straight part.

3. The vehicle opening and closing apparatus according to claim 1, wherein when the current value that flows in the electric motor exceeds a predetermined value, the counter increases a value by which the count value is counted up compared to a case where the current value that flows in the electric motor is less than the predetermined value.

4. The vehicle opening and closing apparatus according to claim 1, wherein when the opening and closing body is in a halfway stop state, the counter counts up the count value at a constant interval of time when the count value is less than a second threshold value that is smaller than the first threshold value and counts down the count value when the count value is equal to or more than the second threshold value.

5. The vehicle opening and closing apparatus according to claim 1, wherein the counter counts down the count value at a predetermined interval of time when electric power distribution of the electric motor is stopped.

6. A vehicle opening and closing apparatus that opens and closes an opening and closing body provided on a vehicle, the apparatus comprising:
   an electric motor that drives the opening and closing body;
   a drive part that is connected to the electric motor and that includes a plurality of switching elements;
   a control part that outputs to the drive part a control signal that commands to rotate forward or rotate reversely the electric motor;
   a position detection part that detects a position of the opening and closing body; and
   a measurement part that measures a current value which flows in the electric motor when the position detection part detects that the opening and closing body arrives at a predetermined position, wherein
   a counter that increments or decrements a count value based on the current value, the count value being updated such that it corresponds to a temperature of the electric motor; and
   a determination part which determines that the count value exceeds a first threshold value indicative of the electric motor being in an overheated state,
   the control part prohibits the next and subsequent opening and closing operation of the opening and closing body when the determination part determines that the count value exceeds the first threshold value to thereby prevent motor burnout due to overheating, and
   the control part increments up the count value of the counter regardless of the current value when the opening and closing body does not arrive at the predetermined position.

7. The vehicle opening and closing apparatus according to claim 6, wherein
   the opening and closing body is operated to be opened and closed along a guide rail that is fixed to the vehicle,
   the guide rail comprises a straight part and a curved part, and
   the predetermined position is provided on the straight part.

8. The vehicle opening and closing apparatus according to claim 6, wherein
   when the current value that flows in the electric motor exceeds a predetermined value, the counter increases a value by which the count value is counted up compared to a case where the current value that flows in the electric motor is less than the predetermined value.

9. The vehicle opening and closing apparatus according to claim 6, wherein
   when the opening and closing body is in a halfway stop state, the counter counts up the count value at a constant interval of time when the count value is less than a second threshold value that is smaller than the first threshold value and counts down the count value when the count value is equal to or more than the second threshold value.

10. The vehicle opening and closing apparatus according to claim 6, wherein
    the counter counts down the count value at a predetermined interval of time when electric power distribution of the electric motor is stopped.

* * * * *